United States Patent
Achilles et al.

(10) Patent No.: US 9,409,773 B2
(45) Date of Patent: Aug. 9, 2016

(54) STEAM-HYDROCARBON REFORMING PROCESS

(71) Applicant: AIR PRODUCTS AND CHEMICALS, INC., Allentown, PA (US)

(72) Inventors: Geoffrey Colling Achilles, Allentown, PA (US); Tamara Lynn Daugherty, Allentown, PA (US); Michelle Schoonover, Macungie, PA (US); Oliver Jacob Smith, IV, New Tripoli, PA (US); Matthew H. MacConnell, Orefield, PA (US); Xianming Jimmy Li, Orefield, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 88 days.

(21) Appl. No.: 14/537,095

(22) Filed: Nov. 10, 2014

(65) Prior Publication Data

US 2016/0130142 A1     May 12, 2016

(51) Int. Cl.
*C01B 3/24*     (2006.01)
*C01B 3/38*     (2006.01)

(52) U.S. Cl.
CPC ........... *C01B 3/38* (2013.01); *C01B 2203/0233* (2013.01); *C01B 2203/042* (2013.01); *C01B 2203/1235* (2013.01); *C01B 2203/1258* (2013.01); *C01B 2203/142* (2013.01)

(58) Field of Classification Search
CPC ...................................................... C01B 3/382
See application file for complete search history.

(56) References Cited

U.S. PATENT DOCUMENTS

| | | | |
|---|---|---|---|
| 6,143,202 A | 11/2000 | Christensen et al. | |
| 6,758,101 B2 | 7/2004 | Valentine | |
| 7,037,485 B1 | 5/2006 | Drnevich et al. | |
| 7,871,826 B2 | 1/2011 | Peng et al. | |
| 8,137,422 B2 | 3/2012 | Licht et al. | |
| 8,440,107 B2 | 5/2013 | Tadd et al. | |
| 8,580,153 B2 | 11/2013 | Vauk et al. | |
| 8,591,769 B2 | 11/2013 | Vauk et al. | |
| 8,591,861 B2 | 11/2013 | Lomax et al. | |
| 2001/0032965 A1 | 10/2001 | Wang | |
| 2002/0096208 A1 | 7/2002 | Jensen et al. | |
| 2002/0178806 A1 | 12/2002 | Valentine | |
| 2002/0197195 A1 | 12/2002 | Epp et al. | |
| 2008/0263953 A1* | 10/2008 | Okada | B01J 8/0492 48/127.9 |
| 2009/0094894 A1 | 4/2009 | Genkin et al. | |

(Continued)

FOREIGN PATENT DOCUMENTS

| | | |
|---|---|---|
| CA | 02842984 | 3/2013 |
| JP | 10120401 | 5/1998 |

(Continued)

OTHER PUBLICATIONS

GASSTM—2040, Gas Analysis Sampling System, User Manual, v1.20, Perma Pure, downloaded from www.permapure.com on Oct. 20, 2014.

*Primary Examiner* — Melvin C Mayes
*Assistant Examiner* — Kenneth Vaden
(74) *Attorney, Agent, or Firm* — Bryan C. Hoke, Jr.

(57) ABSTRACT

A steam-hydrocarbon reforming process utilizing a prereformer where a portion of the effluent from the prereformer is conditioned and the C2+ hydrocarbon content in the conditioned effluent measured. The molar flow rate of steam to the prereformer is increased or decreased responsive to measuring the C2+ hydrocarbon content of the conditioned effluent.

18 Claims, 1 Drawing Sheet

(56) References Cited

U.S. PATENT DOCUMENTS

2009/0232729 A1 9/2009 Genkin et al.
2010/0224834 A1 9/2010 Peng et al.
2014/0134547 A1 5/2014 Tonkovich

FOREIGN PATENT DOCUMENTS

| WO | 2009090351 A1 | 7/2009 | |
| WO | 2013/002752 | 1/2013 | |
| WO | WO 2013041157 A1 * | 3/2013 | .............. C01B 3/382 |

* cited by examiner

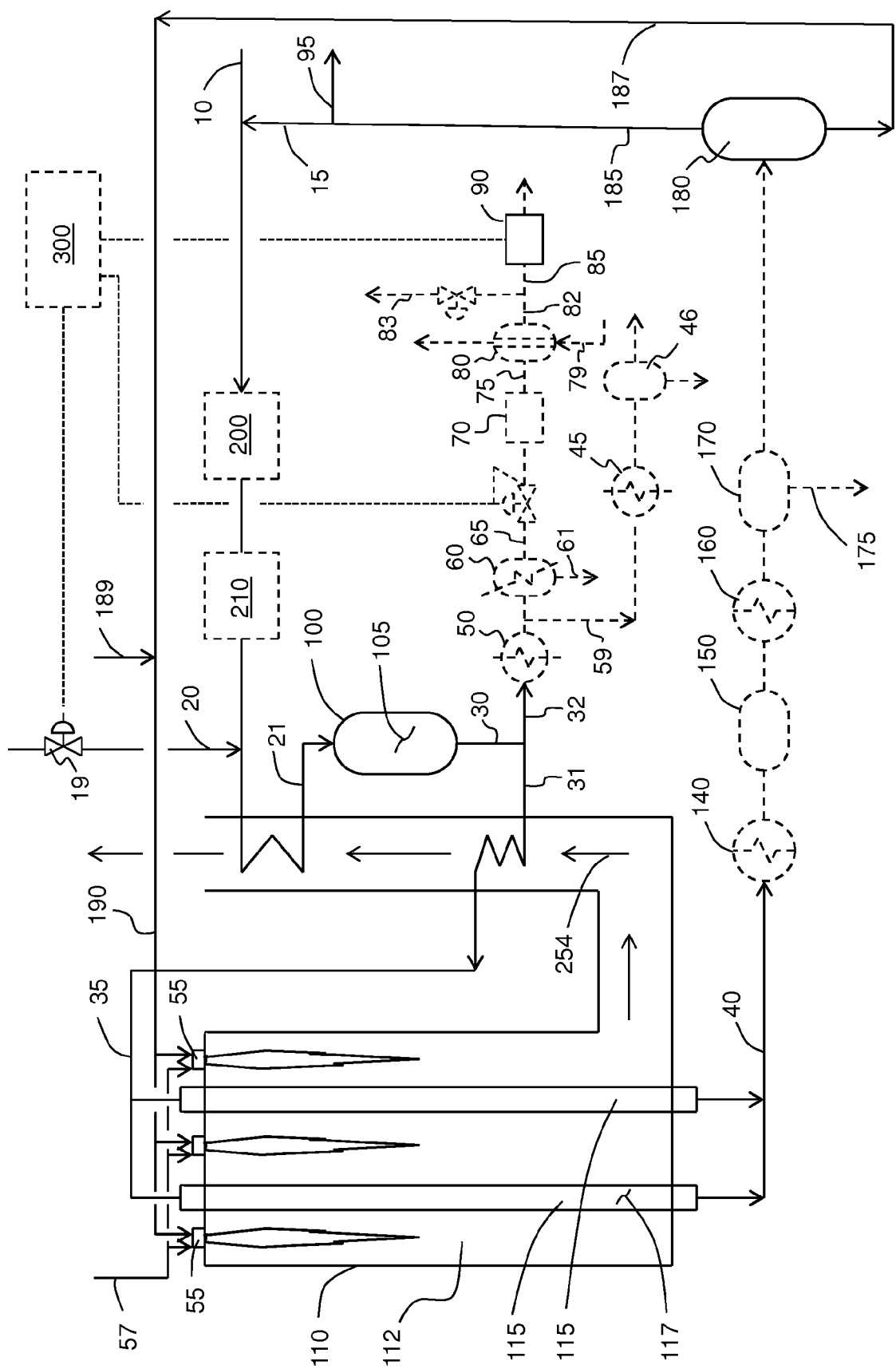

STEAM-HYDROCARBON REFORMING PROCESS

CO-FILED APPLICATION

This application is contemporaneously filed with U.S. patent application Ser. No. 14/536,949, titled "Method for Characterizing the Hydrocarbon Content of a Reformate Stream", incorporated herein by reference.

BACKGROUND

The present invention relates to a process for reforming methane and higher hydrocarbons to produce a synthesis gas (syngas) product and/or a hydrogen product. A synthesis gas product is a product comprising primarily CO and $H_2$. Reformed hydrocarbons may be further reacted in one or more shift reactors to form additional $H_2$ in the process stream and separated in a separation unit, such as a pressure swing adsorption unit, to form a $H_2$ product.

Synthesis gas is conventionally used to produce synthesis gas products such as synthetic crude, or further upgraded to form intermediate or end products, for example lubricant basestock, lubricants, greases, middle distillate fuels, diesel, linear alkylbenzenes aviation and jet fuels, gasoline, and other chemicals, i.e. normal- and iso-paraffinic solvents. The synthesis gas may also be used to produce one or more oxygenates, for example, ethers and/or alcohols.

Synthesis gas (including hydrogen) can be produced from methane-containing feedstocks by any number of primary synthesis gas generation reactors. For example, synthesis gas can be produced in a steam methane reformer (SMR), an endothermic reactor where reaction is carried out either in heat exchange reactors, or by other means where substantial heat may be transferred to the reacting fluid, such as in the case of autothermal reforming (ATR), where a portion of the feedstock is combusted inside the reactor to provide heat for steam reforming either subsequently or in the same location as the combustion.

Synthesis gas can also be produced from methane-containing feedstocks by $CO_2$ ("dry") reforming, catalytic or thermal partial oxidation (CPOx or POx, respectively) and other processes known in the art.

Various feedstocks can be used to produce synthesis gas and industry desires to process multiple feedstocks. Industry desires the ability to change from one feedstock to another during operation without shutting down the reactor. For example, a synthesis gas producer may desire to use natural gas for 6 months, naphtha for 3 months, and then a mixture of natural gas and naphtha for 2 months. Industry desires to process different feedstocks at optimal energy efficiency while avoiding carbon formation in the primary synthesis gas reactor.

In addition to being able to process multiple feedstocks, industry desires to be able to process a feedstock where the composition, particularly the C2+ hydrocarbon concentration in the feedstock, varies over time. For example, synthesis gas may be produced from a refinery offgas where the C2+ hydrocarbon concentration varies from 2 vol. % to 15 vol. % depending on the refinery operation.

If the feedstock contains higher hydrocarbons than methane, that is, hydrocarbons having 2 or more carbon atoms (C2+ hydrocarbons) are used in the reforming process, the risk for catalyst deactivation by carbon deposition in the primary synthesis gas generation reactor is increased. Industry desires to avoid carbon formation in the synthesis gas generation reactor.

In order to reduce the risk of carbon deposition in the primary synthesis gas generation reactor, hydrogen and synthesis gas production processes may employ at least one catalytic reactor prior to the primary synthesis gas generation reactor where the catalytic reactor is operated at conditions less prone to hydrocarbon cracking than the primary synthesis gas generation reactor. These reactors positioned before the primary synthesis gas generation reactors are referred to as pre-reformers. Pre-reformers can be operated adiabatically or convectively heated by indirect heat transfer with combustion products gases from the primary synthesis gas generation reactor.

The activity of the catalyst in the pre-reformer may degrade with use. Industry desires to compensate for the degradation of the pre-reforming catalyst through operational changes to avoid carbon formation in the primary synthesis gas generation reactor while maintaining optimal energy efficiency of the overall process.

In hydrogen and synthesis gas production processes employing pre-reformers and steam methane reformers, the hydrocarbon feedstock may be mixed with hydrogen for a resultant stream having 1 to 5% hydrogen by volume, and subsequently subjected to a hydrodesulphurization (HDS) pretreatment to remove sulphur. The hydrocarbon feedstock may also be treated to remove olefins in a hydrogenation reactor. In case $H_2$ is present in the feedstock, additional $H_2$ might not be added.

For steam reforming of heavy naphthas, hydrogen concentrations as high as about 50 volume % $H_2$ are known where the mixture is subsequently pretreated in a hydrodesulphurization unit and/or a hydrogenation reactor. Even higher hydrogen concentrations are possible depending on the feedstock provided.

The feedstock, after pretreating, is combined with superheated steam to form "mixed feed" having a prescribed steam-to-carbon molar ratio. The steam-to-carbon molar ratio, S/C, is the ratio of the molar flow rate of steam in the mixed feed to the molar flow rate of hydrocarbon-based carbon in the mixed feed. The "steam-to-carbon molar ratio" is a conventional term used in the art.

The steam-to-carbon molar ratio for steam methane reforming of natural gas typically ranges from 2 to 5, but can be as low as 1.5. The steam-to-carbon molar ratio is generally higher for steam methane reforming of feedstock containing a greater amount of higher hydrocarbons, for example, propane, butane, propane/butane mixtures, and naphtha.

Higher steam flow rates are used to suppress carbon formation and enhance the steam reforming reaction. However, higher steam-to-carbon molar ratios disadvantageously decrease the energy efficiency of the reforming process. Industry desires to improve the energy efficiency of steam-hydrocarbon reforming systems.

BRIEF SUMMARY

The present invention relates to a steam-hydrocarbon reforming process utilizing a prereformer.

There are several aspects of the invention as outlined below. In the following, specific aspects of the invention are outlined below. The reference numbers and expressions set in parentheses are referring to an example embodiment explained further below with reference to the FIGURES. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. A steam-hydrocarbon reforming process comprising:

passing a feed stream (21) to a first reactor (100) containing a catalyst (105) during a first period, reacting the feed stream (21) in the first reactor (100) in the presence of the catalyst (105) under reaction conditions sufficient to react the feed stream (21) and form an intermediate product stream (30), and withdrawing the intermediate product stream (30) from the first reactor (100);
  wherein the feed stream (21) comprises steam and hydrocarbons including C2+ hydrocarbons, wherein the concentration of the C2+ hydrocarbons in the feed stream (21) varies during the first period;
  wherein the feed stream (21) has a molar flow rate of hydrocarbons, $F_{HC}$; and
  wherein the feed stream (21) has a molar flow rate of steam, $F_S$, thereby defining a ratio, $F_S/F_{HC}$, of the molar flow rate of steam to the molar flow rate of hydrocarbons in the feed stream (21);
dividing the intermediate product stream (30) into a first portion (31) and a second portion (32), the second portion (32) of the intermediate product stream (30) having a mass flow rate, $M_1$;
introducing a second reactor feed stream (35) comprising the first portion 31 of the intermediate product stream (30) into a second reactor (110), reacting the second reactor feed stream (35) in the second reactor (110) in the presence of a second catalyst (117) under reaction conditions sufficient to form a reformate (40) comprising $H_2$, CO, $CH_4$, and $H_2O$, and withdrawing the reformate (40) from the second reactor (110);
conditioning the second portion (32) to remove at least water and ammonia and form a conditioned portion (85) of the second portion (32) of the intermediate product stream (30);
measuring a C2+ hydrocarbon content in the conditioned portion (85) of the second portion (32) of the intermediate product stream (30) in a chemical component analyzer (90);
increasing the ratio of the molar flow rate of steam to the molar flow rate of hydrocarbons in the feed stream (21) responsive to the step of measuring the C2+ hydrocarbon content when the C2+ hydrocarbon content equals or exceeds an upper target C2+ hydrocarbon content during the first period; and
decreasing the ratio of the molar flow rate of steam to the molar flow rate of hydrocarbons in the feed stream (21) responsive to the step of measuring the C2+ hydrocarbon content when the C2+ hydrocarbon content equals or drops below a lower target C2+ hydrocarbon content during the first period.

Aspect 2. The process of aspect 1 wherein the second reactor feed stream (35) is introduced into a plurality of catalyst-containing reformer tubes (115) in the second reactor (110), and wherein the reformate (40) is withdrawn from the plurality of catalyst-containing reformer tubes (115), the process further comprising:

combusting a fuel (190) with an oxidant gas (57) in a combustion section (112) of the second reactor (110) external to the plurality of catalyst-containing reformer tubes (115) under conditions sufficient to combust the fuel (190) to form a combustion product gas (254) and generate heat to supply energy for reacting the second reactor feed stream (35) inside the plurality of catalyst-containing reformer tubes (115), and withdrawing the combustion product gas (254) from the combustion section (112).

Aspect 3. The process of aspect 1 or aspect 2 wherein the step of conditioning comprises:

removing water from the second portion (32) of the intermediate product stream (30) by condensation to form a water-depleted portion (65) of the second portion (32) of the intermediate product stream (30);
removing ammonia from the water-depleted portion (65) of the second portion (32) of the intermediate product stream (30) thereby forming an ammonia-depleted portion (75) of the second portion (32) of the intermediate product stream (30); and
passing the ammonia-depleted portion (75) to a dryer (80) to remove water and form a dried portion (82) of the second portion (32) of the intermediate product stream (30), the dried portion (82) of the second portion (32) having a mass flow rate, $M_d$;
wherein the conditioned portion (85) of the second portion (32) of the intermediate product stream (30) comprises at least a portion of the dried portion (82).

Aspect 4. The process of the preceding aspect wherein the dryer (80) is a membrane dryer.

Aspect 5. The process of aspect 3 or aspect 4 wherein $M_d \leq 0.20 \times M_1$.

Aspect 6. The process of any one of the preceding aspects further comprising:

monitoring the C2+ hydrocarbon content in the conditioned portion (85) as a function of the molar flow rate of steam, $F_s$, and the molar flow rate of hydrocarbons, $F_{HC}$, in the feed stream (21); and
assessing whether to replace the catalyst (105) in the first reactor (100) responsive to the step of monitoring;
wherein during a second period after the first period, the process comprises replacing the catalyst (105) in the first reactor (100) responsive to the step of assessing whether to replace the catalyst (105) in the first reactor (100).

Aspect 7. The process of any one of the preceding aspects further comprising:

evaluating the activity of the catalyst (105) in the first reactor (100) by assessing the response of the measured C2+ hydrocarbon content in the conditioned portion (85) to the step of increasing the ratio of the molar flow rate of steam, $F_s$, to the molar flow rate of hydrocarbons, $F_{HC}$, in the feed stream (21); and
wherein during a second period after the first period, the process comprises replacing the catalyst (105) in the first reactor (100) responsive to the step of evaluating the activity of the catalyst (105) in the first reactor (100).

Aspect 8. The process of any one of the preceding aspects wherein the chemical component analyzer is a gas chromatograph.

Aspect 9. The process of any one of the preceding aspects further comprising:

separating the reformate (40) by pressure swing adsorption to produce a hydrogen-containing product (185) and a by-product gas (187).

Aspect 10. The process of any one of the preceding aspects wherein in the step of conditioning the second portion (32), water is removed in an amount such that the conditioned portion (85) of the second portion (32) has a water content less than 0.3 vol. %, and ammonia is removed in an amount such that the conditioned portion (85) of the second portion (32) has an ammonia content less than 5 ppmv.

Aspect 11. The process of any one of the preceding aspects further comprising:

pretreating a feedstock (10) comprising hydrocarbons including C2+ hydrocarbons by hydrogenation and/or hydrodesulphurization; and mixing steam (20) with the pretreated feedstock to form the feed stream (21) to the first reactor (100).

Aspect 12. The process of the proceeding aspect further comprising supplying at least a portion (15) of the hydrogen-containing product (185) of aspect 9 for the pretreatment of the feedstock (10).

Aspect 13. The process of any one of the preceding aspects further comprising:

increasing the ratio of the molar flow rate of steam to the molar flow rate of hydrocarbons in the feed stream (21) responsive to the step of measuring the C2+ hydrocarbon content;

measuring the C2+ hydrocarbon content in the conditioned portion (85) while reacting the feed stream (21) with the increased ratio in the first reactor (100);

comparing the measured C2+ hydrocarbon content with an allowable content value representative for the C2+ hydrocarbon content in the conditioned portion (85) at the increased ratio of the molar flow rate of steam to the molar flow rate of hydrocarbons; and replacing the catalyst (105) in the first reactor (100) if the measured C2+ hydrocarbon content is greater than the allowable content value.

Aspect 14. The process of any one of the preceding aspects wherein the step of conditioning comprises:

cooling the second portion (32) in a heat exchanger (50) of the intermediate product stream (30) to condense water from the second portion (32) thereby forming a liquid fraction and a vapor fraction;

dividing the cooled second portion (32) into a water-depleted vapor fraction-enriched portion (65) having a time-averaged mass flow rate, $F_1$, a liquid fraction-enriched portion (59) having a time-averaged mass flow rate, $F_2$, and removing at least water and ammonia from the water-depleted vapor fraction-enriched portion (65) to form the conditioned portion (85);

wherein $F_1$ and $F_2$ are controlled such that $$0 < \frac{F_1}{F_1 + F_2} \leq 0.2.$$

Aspect 15. The process of any one of the preceding aspects wherein control of the ratio ($F_S/F_{HC}$) of the molar flow rate of steam to the molar flow rate of hydrocarbons in the feed stream (21) is based primarily or solely on the measured C2+ hydrocarbon content in the conditioned portion (85).

Aspect 16. The process of any one of the preceding aspects wherein the ratio ($F_S/F_{HC}$) of the molar flow rate of steam to the molar flow rate of hydrocarbons in the feed stream (21) is increased or decreased depending on the measured C2+ hydrocarbon content in the conditioned portion (85), any further measured physical or chemical property of the feed stream (21), the intermediate product stream (30) or any other product stream of the process influencing the degree of increase and decrease, at most.

Aspect 17. The process of any one of the preceding aspects wherein the C2+ hydrocarbon content is either a concentration of C2+ hydrocarbons in the conditioned portion (85) of the second portion (32) of the intermediate product stream (30) or a ratio of the C2+ hydrocarbon content and a measured $H_2$, CO or $CH_4$ content in the conditioned portion (85).

BRIEF DESCRIPTION OF SEVERAL VIEWS OF THE DRAWINGS

The FIGURE is a process flow diagram of a steam-hydrocarbon reforming system for the present process.

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity means one of (1) the first entity, (2) the second entity, and (3) the first entity and the second entity. The term "and/or" placed between the last two entities of a list of 3 or more entities means at least one of the entities in the list including any specific combination of entities in this list.

The term "plurality" means "two or more than two."

The phrase "at least a portion" means "a portion or all." The at least a portion of a stream may have the same composition with the same concentration of each of the species as the stream from which it is derived. As used herein a "divided portion" of a stream is a portion having the same chemical composition and species concentrations as the stream from which it was taken. The at least a portion of a stream may have a different concentration of species than that of the stream from which it is derived. The at least a portion of a stream may include only specific species of the stream from which it is derived. As used herein a "separated portion" of a stream is a portion having a different chemical composition and different species concentrations than the stream from which it was taken.

As used herein, "first," "second," "third," etc. are used to distinguish from among a plurality of steps and/or features, and is not indicative of the total number, or relative position in time and/or space unless expressly stated as such.

The term "depleted" means having a lesser mole % concentration of the indicated component than the original stream from which it was formed. "Depleted" does not mean that the stream is completely lacking the indicated component.

The terms "rich" or "enriched" means having a greater mole % concentration of the indicated component than the original stream from which it was formed.

The present invention relates to a process for reacting steam and one or more hydrocarbons to form a reformate in a system that utilizes at least two reforming reactors, e.g. a preformer and a reformer furnace (primary furnace, catalytic steam methane reformer, etc.).

The present invention will be described with the aid of the sole FIGURE showing a first reactor 100 and a second reactor 110.

The first reactor 100 may be a so-called "prereformer."

So-called "prereformers" are well-known in the art. A prereformer is a reactor containing catalyst 105 suitable for catalyzing the reforming reaction. Steam 20 and a feedstock 10 comprising one or more hydrocarbons are contacted with the catalyst 105 and reacted to a limited extent in the first reactor 100. Generally the higher hydrocarbons (e.g. C2+ hydrocarbons) are preferentially reacted compared to methane in the first reactor 100. The first reactor may be an adiabatic fixed bed reactor where heat is neither actively added nor removed. The first reactor may be a tubular reactor. The first reactor may be a convectively heated prereformer where the prereformer is heated by combustion product gases from the reformer furnace 110, reformate 40 from the reformer furnace 110, and/or steam from the process.

Catalyst 105 used in the first reactor 100 may be any suitable reforming catalyst known in the art for so-called "prereforming." Catalyst 105 may comprise at least one metal selected from a group consisting of nickel, cobalt, platinum, palladium, rhodium, ruthenium, iridium and mixtures thereof. A prereformer generally employs a different type of catalyst than the reformer furnace, for example a high activity, high nickel content catalyst.

Catalysts for prereforming are commercially available. Catalysts suitable for prereforming are discussed in U.S. Pat. No. 4,105,591, U.S. Pat. No. 3,882,636, U.S. Pat. No. 3,988,425, GB 969,637, GB 1,150,066, and GB 1,155,843.

Since the articles "a" and "the" mean one or more, more than one prereformer and more than one catalyst may be used.

The process comprises passing feed stream 21 to the first reactor 100 containing catalyst 105 during a first period (i.e. from a time $t_1$ to a time $t_2$), reacting the feed stream 21 in the first reactor 100 in the presence of the catalyst 105 under reaction conditions sufficient to react the feed stream 21 and form an intermediate product stream 30, and withdrawing the intermediate product stream 30 from the first reactor 100. The intermediate product stream 30 comprises $H_2$, $CH_4$, $H_2O$, and $NH_3$, and may comprise one or more of C2+ hydrocarbons, CO, and $CO_2$.

Reaction conditions sufficient to react the feed stream include a temperature ranging from about 400° C. to about 730° C. and a pressure ranging from about 0.2 MPa to about 5.6 MPa.

The feed stream 21 comprises steam and hydrocarbons including $CH_4$ and C2+ hydrocarbons. C2+ hydrocarbons are hydrocarbons having 2 or more carbon atoms, e.g. ethane, ethene, propane, propene, butane, butene, etc. The concentration of the C2+ hydrocarbons in the feed stream 21 is not constant during the whole first period but changes during at least a portion of the first period (i.e. during the time from $t_1$ to the time $t_2$). The concentration of the C2+ hydrocarbons in the feed stream 21 may vary due to a change in the feedstock where the C2+ hydrocarbon concentration may vary widely, and/or variations in the composition of the particular feedstock used. The feed stream 21 has a molar flow rate of hydrocarbons, $F_{HC}$ and a molar flow rate of steam, $F_S$, thereby defining a ratio, $F_S/F_{HC}$, of the molar flow rate of steam to the molar flow rate of hydrocarbons in the feed stream 21.

Feed stream 21 is formed from a steam stream 20 and a feedstock stream 10.

Feedstock stream 10 may comprise one or more of natural gas, naphtha, refinery off-gas, or refinery fuel gas. The concentration of components in each of these possible feedstocks is known to vary thereby causing variability in the concentration of the C2+ hydrocarbons in the feed stream 21. The variability in the concentration of the C2+ hydrocarbons in the feed stream 21 can cause the reactions in the first reactor 100 to vary between endothermic and exothermic. This change in reaction character may impact the propensity for C2+ hydrocarbon slip through the first reactor 100.

The feedstock 10 for forming the feed stream 21 may be pretreated prior to being introduced into the prereformer 100. As shown in the FIGURE, the feedstock may be pretreated in a hydrogenation unit 200 to convert olefins to their alkane counterparts and/or a hydrodesulphurization unit 210 to remove sulfur. Hydrogenation and hydrodesulphurization are well-known in the art.

As shown in the FIGURE, hydrogen 15 may be mixed with the feedstock prior to introducing the feedstock 10 into the hydrogenation unit or the hydrodesulphurization unit. Hydrogen 15 is needed in the case of olefins in the hydrocarbon feedstock for reaction in the hydrogenation unit 200 to convert olefins to alkanes. Hydrogen 15 is needed in the case of sulfur in the hydrocarbon feedstock for reaction in the hydrodesulphurization unit 210 to form $H_2S$, which is typically removed by reaction with Zn in the hydrodesulphurization unit 210.

Hydrogen 15 may be supplied from any available source. As shown in the FIGURE, hydrogen 15 may be conveniently supplied from a portion of a $H_2$ product stream from a separation unit 180 such as, for example, a pressure swing adsorber.

Steam 20 is mixed with the feedstock after optional pretreatment to form feed stream 21, which is typically called "mixed feed." The feed stream 21 may be heated by indirect heat transfer with combustion product gases from second reactor 110, for example in the convection section of a steam methane reformer.

The process comprises dividing the intermediate product stream 30 into a first portion 31 and a second portion 32. The intermediate product stream 30 may be divided during the whole first period or during intervals within the first period. The intermediate product stream 30 may be divided by any known means, for example a pipe "T", with flow rates of the first portion 31 and second portion 32 controlled by one or more valves (not shown).

The process comprises introducing a second reactor feed stream 35 comprising the first portion 31 of the intermediate product stream 30 into a second reactor 110, reacting the second reactor feed stream 35 in the second reactor 110 in the presence of a second catalyst 117 under reaction conditions sufficient to form a reformate 40 comprising $H_2$, CO, $CH_4$, and $H_2O$, and withdrawing the reformate 40 from the second reactor 110. The reformate 40 may comprise $CO_2$. And depending on the feedstock, the reformate may also comprise $N_2$.

The second reactor feed stream 35 may consist of the first portion 31 of the intermediate product stream 30.

The second reactor 110 may be any synthesis gas generation reactor known for producing synthesis gas.

The second reactor 110 may be a steam methane reformer (also called a primary reformer, catalytic steam-methane reformer, catalytic steam-hydrocarbon reformer, etc.). Steam methane reformers and their operation are well-known in the art.

The second reactor may be a mixed conducting membrane reactor as disclosed, for example, in U.S. Pat. No. 6,110,979, incorporated herein by reference.

The second catalyst 117 may be a reforming catalyst. The reforming catalyst may be any suitable reforming catalyst known in the art.

The reaction conditions in the second reactor 110 may include a temperature ranging from 500° C. to 1000° C. and a pressure ranging from 0.2 MPa (2 atm.) to 5.6 MPa (55 atm.).

The second reactor 110 may comprise a plurality of catalyst-containing reformer tubes 115. The second reactor feed stream 35 may be introduced into the plurality of catalyst-containing reformer tubes 115 in the second reactor. The second reactor feed stream 35 may be reacted in the plurality of catalyst-containing reformer tubes 115 and the reformate 40 withdrawn from the plurality of catalyst-containing reformer tubes 115.

The process may further comprise combusting a fuel 190 with an oxidant gas 57 in a combustion section 112 of the second reactor 110 external to the plurality of catalyst-containing reformer tubes 115 under conditions sufficient to combust the fuel 190 to form a combustion product gas 254 and generate heat to supply energy for reacting the second reactor feed stream 35 inside the plurality of catalyst-containing reformer tubes 115, and withdrawing the combustion product gas 254 from the combustion section 112.

The fuel 190 and oxidant gas 57 may be introduced into the combustion section of the reformer furnace using burners 55. Any suitable fuel 190 known in the art may be used. Typically the oxidant gas 57 is air. The air may be heated (not shown), for example, by heat exchange with steam, the combustion product gas 254 in the convection section of the reformer furnace, and/or by the reformate stream from the steam-hydrocarbon reformer. The fuel may also be heated (not shown), for example by by heat exchange with a steam stream, the combustion product gas 254 in the convection section of the reformer furnace and/or by the reformate stream from the steam-hydrocarbon reformer.

Conditions sufficient to combust the fuel 190 may include any suitable temperature range and pressure range, for example, a temperature ranging from 600° C. to 1500° C. and a pressure ranging from 98 kPa to 102 kPa (absolute). The temperature corresponds to the furnace temperature, not the flame temperature.

The process comprises conditioning the second portion 32 to remove at least water and ammonia and form a conditioned portion 85 of the second portion 32 of the intermediate product stream 30. While is may be desirable to remove all of the water and all of the ammonia, complete removal may not be possible and is not required. As used herein "to remove at least water and ammonia" does not mean complete removal of water and ammonial, but rather that some water and some ammonia are removed. Preferably substantially all of the water and substantially all of the ammonia is removed from the second portion 32 to form the conditioned portion 85. Removal of ammonia by conditioning may result in an ammonia content in the conditioned portion that is less than 100 ppmv, or less than 50 ppmv, or less than 5 ppmv, or less than 1 ppmv. Removal of water by conditioning may result in a water content in the conditioned portion that is less than 1 vol. %, or less than 0.3 vol. %, or less than 0.2 vol. %, or less than 0.1 vol. %.

The step of conditioning may comprise removing water from the second portion 32 of the intermediate product stream 30 by condensation to form a water-depleted portion 65 of the second portion 32 of the intermediate product stream 30. The step of removing water may comprise cooling the second portion 32 in a heat exchanger 50 to condense water from the second portion 32 and separating the liquid water-enriched portion (condensate) 59 from the second portion 32 to form the water-depleted portion 65. Since ammonia is soluble in liquid water, some of the ammonia present in the second portion 32 is removed with the liquid water-enriched portion 59. Heat exchanger 50 may be an ambient air-cooled heat exchanger.

The water-depleted portion 65 and the liquid water-enriched portion 59 may be divided where the water-depleted portion 65 has a time-averaged mass flow rate $F_1$, and the liquid water-enriched portion 59 has a time-averaged mass flow rate, $F_2$.

Time-averaged mass flow rates are calculated in the conventional way from the generalized equation:

$$\bar{\xi} = \frac{1}{\tau}\int_{t_1}^{t_2} \xi(t)dt$$

where $\bar{\xi}$ is the time-averaged mass flow rate, $\xi$ is the instantaneous mass flow rate, t is time, where the specified quantity (i.e. first, second, third, etc.) flows from $t=t_1$ to $t=t_2$, where $t=t_1$ at the beginning of the flow of the specified quantity, $t=t_2$ at the end of the flow of the specified quantity, and where $\tau=t_2-t_1$.

The time-averaged mass flow rates $F_1$ and $F_2$ may be controlled such that $$\frac{F_1}{F_1+F_2} \leq 0.2$$

where $F_1$ is nonzero. This means that only a reduced fraction of the original stream is used and further processed for later measurements in a chemical component analyzer 90 such as, for example, a gas chromatograph. This allows for a larger flow rate of the sample passing from the source to the first heat exchanger 50 which has the advantages of decreasing the risk of condensation in the conduit from the source, increasing the sample response speed by decreasing the residence time of the sample gas from the source to the conditioning system and gas chromatograph 90. This also has the advantage of concentrating the hydrocarbon components.

The liquid water-enriched portion 59 may be further cooled in a heat exchanger 45 with water separated in liquid trap 46. The vapor portion from the liquid trap may be vented, flared, or combusted in the combustion section of the reformer furnace. The water portion from the liquid trap 46 may be optionally treated and recycled or disposed of as desired.

The step of removing water from the second portion 32 of the intermediate product stream 30 may comprise further cooling of the second portion 32 in a second heat exchanger 60 to condense more water from the second portion 32 and separating the condensate portion 61 from the second portion 32 to form the water-depleted portion 65. The second heat exchanger 60 may be a chiller that cools the second portion 32 to a temperature ranging from 0° C. to 10° C. or from 2° C. to 7° C.

The two-stage condensation in the first heat exchanger 50 and second heat exchanger 60 addresses the problem related to the high water content in reformate streams. Unexpectedly, the water removal does not appreciably affect the concentration of the C2+ hydrocarbons in the second portion 32.

The step of conditioning may also comprise removing ammonia from the water-depleted portion 65 of the second portion 32 of the intermediate product stream 30 thereby forming an ammonia-depleted portion 75 of the second portion 32 of the intermediate product stream 30.

The ammonia may be removed by any known means. The ammonia may, for example, be removed by chemical reaction with a scrubber media in ammonia scrubber 70. Any scrubber media known to remove ammonia may be used. The ammonia scrubber media may comprise phosphoric acid. The ammonia scrubber 70 may be, for example, an AS™-Series Ammonia Scrubber commercially available from Perma Pure, LLC.

The step of conditioning may also comprise passing the ammonia-depleted portion 75 to a dryer 80 to further remove water and form a dried portion 82 of the intermediate product stream 30. Any suitable dryer may be used. As discussed above, the dried portion may contain residual amounts of water.

The dryer 80 may be a membrane dryer. The dryer 80 may be a PRISM® Membrane Dryer commercially available from Air Products and Chemicals, Inc. or a membrane dryer commercially available from Perma Pure. A dry nitrogen stream 79 may be used in the membrane dryer as a purge gas to facilitate removing water from the ammonia depleted portion 75.

The conditioned portion 85 of the second portion 32 of the intermediate product stream 30 comprises at least a portion of the dried portion 82. The conditioned portion 85 may consist of at least a portion of the dried portion 82. The dried portion 82 may be divided into a vented portion 83 and the conditioned portion 85 that is sampled in the chemical component analyzer 90. The conditioned portion 85 may be a small fraction of the dried portion 82, for example, less than 5 mass %, or less than 1 mass % of the dried portion 82. The vented portion may be flared, if desired, or introduced at any suitable location in the reforming system, for example in the combustion space of the reformer furnace 110. By providing venting of the vented portion 83, the conditioning system can be operated continuously, while sampling of the stream done only intermittently. The advantage of this is to prevent water from condensing in undesirable locations in the conditioning system or feed lines to the conditioning system.

The dried portion 82 may be a small fraction of the total second portion 32 formed when dividing the intermediate product stream 30. The second portion 32 of the intermediate product stream 30 may have a non-zero mass flow rate, $M_1$, and the dried portion 82 may have a non-zero mass flow rate, $M_d$, and $M_d$ may be less than or equal to $0.20 M_1$. The advantage of maintaining a larger mass flow rate of the second portion 32 is that condensation of water in the conduit feeding the conditioning system can be more easily prevented.

The process comprises measuring a C2+ hydrocarbon content in the conditioned portion 85 of the second portion 32 of the intermediate product stream 30 in a chemical component analyzer 90. The chemical component analyzer 90 may be a gas chromatograph (GC). The chemical component analyzer 90 may be a mass spectrometer. The chemical component analyzer 90 may be a non-methane hydrocarbon analyzer, which uses a flame ionization detector, for example, as available from Baseline—MOCON, Inc. The chemical component analyzer 90 may be a tunable diode laser analyzer, for example, as available from Yokogawa. The C2+ hydrocarbon content may be, for example, a concentration of C2+ hydrocarbons, or a ratio with one of the other components in the conditioned portion 85.

The chemical component analyzer 90 may be in signal communication with a controller 300. The controller 300 may be any computer, PLC, or the like that is capable of sending and/or receiving electronic signals from the chemical component analyzer 90. The controller 300 may send signals to the chemical component analyzer 90 to instruct the chemical component analyzer 90 to take in a sample and measure the sample. The controller 300 may receive signals from the chemical component analyzer 90 that characterize the C2+ hydrocarbon content.

The ratio of the molar flow rate of steam to the molar flow rate of hydrocarbons in the feed stream 21 is adjusted responsive to the step of measuring the C2+ hydrocarbon content in the conditioned portion 85 of the second portion 32 of the intermediate product stream 30 during the first period. The C2+ hydrocarbon content in the conditioned portion 85 may vary due to the variability in the concentration of the C2+ hydrocarbons in the feed stream 21 and/or changes in the prereformer catalyst activity.

When the measured C2+ hydrocarbon content equals or exceeds an upper target C2+ hydrocarbon content, the ratio of the molar flow rate of steam to the molar flow rate of hydrocarbons is caused to be increased. When the measured C2+ hydrocarbon content equals or drops below a lower target C2+ hydrocarbon content, the ratio of the molar flow rate of steam to the molar flow rate of hydrocarbons is caused to be decreased. The ratio of the molar flow rate of steam to the molar flow rate of hydrocarbons may be caused to increase or decrease by manual manipulation of one or more valves or using automatic control using controller 300. For example, controller 300 may be in signal communication with valve 19 and able to control the opening and closing of valve 19 to adjust the flow rate of steam 20.

The lower target may be zero. It may be desirable to control the steam flow rate to achieve a C2+ hydrocarbon content that is nearly zero.

By changing the steam flow rate responsive to the measured C2+ hydrocarbon concentration in the conditioned portion 85 of the second portion 32 of the intermediate product stream 30, the present process satisfies industry's desire to process feed having varying C2+ hydrocarbon concentration with improved energy efficiency while reducing the propensity for carbon formation in the second reactor 110 (i.e. the primary synthesis generation reactor). The present process achieves these desires independent of changes of the catalyst activity in the first reactor 100 (i.e. the prereformer).

The present process is also useful for monitoring decreased activity of the catalyst 105 in the first reactor 100. The activity of the catalyst may be decreased, for example, due to catalyst poisoning and/or catalyst sintering.

Since the character (endothermic/exothermic) of the reaction in the first reactor 100 may be impacted by the concentration of C2+ hydrocarbons in the feed, monitoring the catalyst performance via temperature profile monitoring may be problematic.

The process may further comprise monitoring the C2+ hydrocarbon content as a function of the molar flow rate of steam and the molar flow rate of hydrocarbons, and assessing whether to replace the catalyst 105 in the first reactor 100 responsive to the step of monitoring.

To compensate for decreased activity of the catalyst, the molar flow rate of steam will be increased for a given feedstock to maintain the C2+ hydrocarbon content below the upper target C2+ hydrocarbon content. The energy efficiency of the process decreases as the molar flow rate of steam increases. The decision to replace the catalyst depends on the economics of continuing to operate the process with the degraded efficiency compared to the cost of replacing the catalyst.

In case the economics favor replacing the catalyst 105, the process may further comprise replacing the catalyst 105 in the first reactor 100 responsive to the step of assessing whether to replace the catalyst 105 in the first reactor 100. The catalyst 105 is then replaced during a second time period after the first time period (i.e. from a time $t_3$ to a time $t_4$, where $t_3$ is after $t_2$).

In addition or alternatively, the activity of the catalyst 105 can be evaluated by comparing a response to changes in the molar flow rate of steam. For example, if an increase in the molar flow rate of steam does not produce an expected or desired change in the C2+ hydrocarbon content, one can assess the decrease in the catalyst activity.

The process may further comprise evaluating the activity of the catalyst 105 in the first reactor 100 by assessing the response of the measured C2+ hydrocarbon content to the step of increasing the ratio of the molar flow rate of steam to the molar flow rate of hydrocarbons in the feed stream 21. The measured C2+ hydrocarbon content may be compared with an allowable content value representative for the C2+ hydrocarbon content in the conditioned portion at the increased ratio of the molar flow rate of steam to the molar flow rate of hydrocarbons.

In case the economics favor replacing the catalyst 105, the process may further comprise replacing the catalyst 105 in the first reactor 100 responsive to the step of evaluating the activity of the catalyst 105 in the first reactor 100. The catalyst 105 is then replaced during a second time period after the first time period (i.e. from a time $t_3$ to a time $t_4$, where $t_3$ is after $t_2$).

The reformate 40 may be used to generate steam in a waste heat boiler 140 by indirect heat transfer. At least a portion of the steam generated in the waste heat boiler 140 may be used as steam 20 in the process feed.

The reformate 40 may be further processed in one or more shift reactors 150 if desired.

The reformate 40 may be cooled in a heat exchanger 160 to condense water from the reformate 40. Water 175 may be removed from the reformate 40 in a knock-out drum 170.

Carbon dioxide may be removed from the reformate 40 in a $CO_2$ stripper or other $CO_2$ removal unit (not shown), if desired.

The process may further comprise passing at least a portion of the reformate 40 to a separation unit 180 to form a hydrogen-containing product 185 and a by-product gas (tail gas) 187. The separation unit 180 may be a pressure swing adsorber. A portion 95 of the hydrogen-containing product 185 may be exported from the process. Another portion 15 may be recycled to the first reactor 100 in feed stream 21. The $H_2$ may be recycled to the first reactor 100 by way of the hydrodesulphurization unit 200 and/or the hydrogenation unit 210.

The by-product gas 187 may be used as a fuel in the second reactor 110. The by-product gas may be blended with make-up fuel 189 and passed to burners 55 where the by-product gas and make up fuel are combusted with an oxygen-containing gas 57 external to a plurality of catalyst-containing tubes 115.

The separation unit 180 may be a cryogenic separation unit. The process may further comprise passing at least a portion of the product stream 40 from the second reactor 110 to a cryogenic separation unit to form at least one of a CO product stream, a $H_2$ product stream, and an oxogas product. An oxogas is a mixture of CO and $H_2$ having a desired CO:$H_2$ molar ratio. A portion 15 of the $H_2$ product stream may be passed to the first reactor 100 thereby providing at least a portion of the $H_2$ in the mixture.

We claim:

1. A steam-hydrocarbon reforming process comprising:
   passing a feed stream to a first reactor containing a catalyst during a first period, reacting the feed stream in the first reactor in the presence of the catalyst under reaction conditions sufficient to react the feed stream and form an intermediate product stream, and withdrawing the intermediate product stream from the first reactor;
      wherein the feed stream comprises steam and hydrocarbons including C2+ hydrocarbons, wherein the concentration of the C2+ hydrocarbons in the feed stream varies during the first period;
      wherein the feed stream has a molar flow rate of hydrocarbons, $F_{HC}$; and
      wherein the feed stream has a molar flow rate of steam, $F_S$, thereby defining a ratio, $F_S/F_{HC}$, of the molar flow rate of steam to the molar flow rate of hydrocarbons in the feed stream;
   dividing the intermediate product stream into a first portion and a second portion, the second portion of the intermediate product stream having a mass flow rate, $M_1$;
   introducing a second reactor feed stream comprising the first portion of the intermediate product stream into a second reactor, reacting the second reactor feed stream in the second reactor in the presence of a second catalyst under reaction conditions effective to form a reformate comprising $H_2$, CO, $CH_4$, and $H_2O$, and withdrawing the reformate from the second reactor;
   conditioning the second portion to remove at least water and ammonia and form a conditioned portion of the second portion of the intermediate product stream;
   measuring a C2+ hydrocarbon content in the conditioned portion of the second portion of the intermediate product stream in a chemical component analyzer;
   increasing the ratio of the molar flow rate of steam to the molar flow rate of hydrocarbons in the feed stream responsive to the step of measuring the C2+ hydrocarbon content when the C2+ hydrocarbon content equals or exceeds an upper target C2+ hydrocarbon content during the first period; and
   decreasing the ratio of the molar flow rate of steam to the molar flow rate of hydrocarbons in the feed stream responsive to the step of measuring the C2+ hydrocarbon content when the C2+ hydrocarbon content equals or drops below a lower target C2+ hydrocarbon content during the first period.

2. The process of claim 1 wherein the second reactor feed stream is introduced into a plurality of catalyst-containing reformer tubes in the second reactor, and wherein the reformate is withdrawn from the plurality of catalyst-containing reformer tubes, the process further comprising:
   combusting a fuel with an oxidant gas in a combustion section of the second reactor external to the plurality of catalyst-containing reformer tubes under conditions effective to combust the fuel to form a combustion product gas and generate heat to supply energy for reacting the second reactor feed stream inside the plurality of catalyst-containing reformer tubes, and withdrawing the combustion product gas from the combustion section.

3. The process of claim 1 wherein the step of conditioning comprises:
   removing water from the second portion of the intermediate product stream by condensation to form a water-depleted portion of the second portion of the intermediate product stream;
   removing ammonia from the water-depleted portion of the second portion of the intermediate product stream thereby forming an ammonia-depleted portion of the second portion of the intermediate product stream; and passing the ammonia-depleted portion to a dryer to remove water and form a dried portion of the second portion of the intermediate product stream, the dried portion of the second portion having a mass flow rate, $M_d$;

wherein the conditioned portion of the second portion of the intermediate product stream comprises at least a portion of the dried portion.

4. The process of claim 3 wherein the dryer is a membrane dryer.

5. The process of claim 3 wherein $M_d \leq 0.20 \times M_1$.

6. The process of claim 1 further comprising:

monitoring the C2+ hydrocarbon content in the conditioned portion as a function of the molar flow rate of steam, $F_s$, and the molar flow rate of hydrocarbons, $F_{HC}$, in the feed stream; and assessing whether to replace the catalyst in the first reactor responsive to the step of monitoring;

wherein during a second period after the first period, the process comprises replacing the catalyst in the first reactor responsive to the step of assessing whether to replace the catalyst in the first reactor.

7. The process of claim 1 further comprising:

evaluating the activity of the catalyst in the first reactor by assessing the response of the measured C2+ hydrocarbon content in the conditioned portion to the step of increasing the ratio of the molar flow rate of steam, $F_s$, to the molar flow rate of hydrocarbons, $F_{HC}$, in the feed stream; and wherein during a second period after the first period, the process comprises replacing the catalyst in the first reactor responsive to the step of evaluating the activity of the catalyst in the first reactor.

8. The process of claim 1 wherein the chemical component analyzer is a gas chromatograph.

9. The process of claim 1 further comprising:

separating the reformate by pressure swing adsorption to produce a hydrogen-containing product and a by-product gas.

10. The process of claim 9 further comprising:

pretreating a feedstock comprising hydrocarbons including C2+ hydrocarbons by hydrogenation and/or hydrodesulphurization;

mixing steam with the pretreated feedstock to form the feed stream to the first reactor; and supplying at least a portion of the hydrogen-containing product for the pretreatment of the feedstock.

11. The process of claim 1 further comprising:

pretreating a feedstock comprising hydrocarbons including C2+ hydrocarbons by hydrogenation and/or hydrodesulphurization; and mixing steam with the pretreated feedstock to form the feed stream to the first reactor.

12. The process of claim 1 further comprising:

increasing the ratio of the molar flow rate of steam to the molar flow rate of hydrocarbons in the feed stream responsive to the step of measuring the C2+ hydrocarbon content;

measuring the C2+ hydrocarbon content in the conditioned portion while reacting the feed stream with the increased ratio in the first reactor;

comparing the measured C2+ hydrocarbon content with an allowable content value representative for the C2+ hydrocarbon content in the conditioned portion (85) at the increased ratio of the molar flow rate of steam to the molar flow rate of hydrocarbons; and replacing the catalyst in the first reactor if the measured C2+ hydrocarbon content is greater than the allowable content value.

13. The process of claim 1 wherein the step of conditioning comprises:

cooling the second portion in a heat exchanger of the intermediate product stream to condense water from the second portion thereby forming a liquid fraction and a vapor fraction;

dividing the cooled second portion into a water-depleted vapor fraction-enriched portion having a time-averaged mass flow rate, $F_1$, and a liquid fraction-enriched portion having a time-averaged mass flow rate, $F_2$; and removing at least water and ammonia from the water-depleted vapor fraction-enriched portion to form the conditioned portion;

wherein $F_1$ and $F_2$ are controlled such that $$0 < \frac{F_1}{F_1 + F_2} \leq 0.2.$$

14. The process of claim 1 wherein control of the ratio ($F_s/F_{HC}$) of the molar flow rate of steam to the molar flow rate of hydrocarbons in the feed stream is based primarily or solely on the measured C2+ hydrocarbon content in the conditioned portion.

15. The process of claim 1 wherein the ratio ($F_s/F_{HC}$) of the molar flow rate of steam to the molar flow rate of hydrocarbons in the feed stream is increased or decreased depending on the measured C2+ hydrocarbon content in the conditioned portion, any further measured physical or chemical property of the feed stream, the intermediate product stream or any other product stream of the process influencing the degree of increase and decrease, at most.

16. The process of claim 1 wherein the C2+ hydrocarbon content is either a concentration of C2+ hydrocarbons in the conditioned portion of the second portion of the intermediate product stream or a ratio of the C2+ hydrocarbon content and a measured $H_2$, CO or $CH_4$ content in the conditioned portion.

17. The process of claim 1 wherein in the step of conditioning the second portion, water is removed in an amount such that the conditioned portion of the second portion has a water content less than 1.0 vol. % and ammonia is removed in an amount such that the conditioned portion of the second portion has an ammonia content less than 100 ppmv.

18. The process of claim 1 wherein in the step of conditioning the second portion, water is removed in an amount such that the condoned portion of the second portion has a water content less than 0.3 vol. %, and ammonia is removed in an amount such that the conditioned portion of the second portion has an ammonia content less than 5 ppmv.

* * * * *